United States Patent [19]

Honda et al.

[11] Patent Number: 4,490,010
[45] Date of Patent: Dec. 25, 1984

[54] REAR PROJECTION SCREEN

[75] Inventors: Makoto Honda, Kamifukuoka; Akira Izawa, Kawasaki; Yutaro Moriguchi, Tokyo, all of Japan

[73] Assignee: Dai Nippon Insatsu Kabushiki Kaisha, Tokyo, Japan

[21] Appl. No.: 502,463

[22] Filed: Jun. 9, 1983

[30] Foreign Application Priority Data

Jun. 10, 1982 [JP] Japan .................................. 57-99692
Oct. 15, 1982 [JP] Japan ................................ 57-180790
Dec. 3, 1982 [JP] Japan ................................ 57-183175

[51] Int. Cl.$^3$ ............................................. G03B 21/60
[52] U.S. Cl. ....................................... 350/128; 358/60
[58] Field of Search ................... 358/60, 56; 350/117, 350/124, 127, 128, 126, 167; 354/1

[56] References Cited

U.S. PATENT DOCUMENTS

| | | | |
|---|---|---|---|
| 3,830,556 | 8/1974 | Bratkowski | 350/128 |
| 4,172,219 | 10/1979 | Deml et al. | 350/128 X |
| 4,298,246 | 11/1981 | Iwamura | 350/128 X |
| 4,431,266 | 2/1984 | Mori et al. | 350/167 |
| 4,432,608 | 2/1984 | Grup | 350/128 |
| 4,443,814 | 4/1984 | Mori et al. | 358/60 |

Primary Examiner—Richard A. Wintercorn
Attorney, Agent, or Firm—Koda and Androlia

[57] ABSTRACT

A rear projection screen has a rear side consisting of an array of convex lenses and a front side consisting of also convex lenses whose optic axes are substantially in line with those of the convex lenses at the rear side. Projections or raised portions are provided which surround the front convex lenses and are extended forwardly thereof and light masking strips or layers are formed over the projections or raised portions.

6 Claims, 14 Drawing Figures

REAR PROJECTION SCREEN

BACKGROUND OF THE INVENTION

The present invention relates to a rear projection screen used as a screen in a projection television system or the like.

There have been devised and demonstrated various types of rear projection screens. Recently the rear projection screens are used with the projection color television systems. That is, three primary color images, i.e. red, green and blue color images are projected on a screen and combined to form a color image. On the other hand, in the cases of color slide projectors and color motion picture projectors, a colored image is projected on a screen. Thus the former type rear projection screens have many problems to be left unsolved as compared with the latter type rear projection screens.

In the case of a projection system in which a plurality of different color images are projected on the rear side of a screen by different color projectors spaced apart from each other by a small distance. For instance, when a plurality of different color images are projected on the lens surface of a plano-lenticular lens, good color balance can be attained at the center portion, but the desired color balance cannot be obtained at the portions adjacent to the edge of the lens surface because of the difference in distribution of the intensity of the different color images.

In the case of color slide projectors and color motion picture projectors, luminance of the projected image can be considerably improved if the problem of cooling the projectors is overcome. In the case of the projection color television systems, when the electron beams scan a phosphor-dot screen, each phosphor dot produces red, green or blue light so that a considerably bright color image can be displayed on the screen. However, it is difficult to improve both luminance or brightness of the projected image and the lifetime. Moreover, the light emanating from a projection color television system must be efficiently converged to a viewing field.

In the case of the rear projection screen, the light beams emitted from a projector will not be interferred by a viewer so that a rear projection screen may be located at any convenient place in a relatively narrow room. Moreover, it has a further advantage that the rear projection screens can be used in relatively bright rooms. However, when ambient light is reflected by a screen or when a viewer or an object is reflected by a screen, the contrast of the projected image is lowered and consequently the visibility is degraded to some extent.

There has been proposed to use a combination of a Fresnel lens and a lenticular lens or a combination of a plurality of lenticular lenses as a rear projection screen. But when more than two lenses are used, diffusion planes are increased so that the resolution is reduced. Furthermore it requires a complicated and difficult process for cementing two lenses.

SUMMARY OF THE INVENTION

It is an object of this invention to provide a rear projection screen in which, when it is used as a screen of a television system, the image projected on the screen is uniform in luminance, has a high degree of luminance and contrast and is well balanced in color, without using a circular Fresnel lens and which is adapted to mass production.

According to this invention, there is provided a rear projection screen used as a screen of television systems or the like to form images thereon by rays of light projected from at least one projector located in a rear position of the screen, which comprises: a first lens surface formed on one side and having an array of a plurality of convex lenses; a second lens surface formed on the other side and having an array of a plurality of convex lenses whose axes are substantially in line with those of the convex lenses of said first lens surface; and light masking layers formed on projections or raised portions which are projected so as to surround each of convex lenses of the second lens surface and which are extended forwardly of said second lens surface.

The nature, utility, and further features of this invention will be more clearly apparent from the following detailed description with respect to a preferred embodiment of the invention when read in conjunction with the accompanying drawing briefly described below.

DETAILED DESCRIPTION OF THE INVENTION

Figure 1:
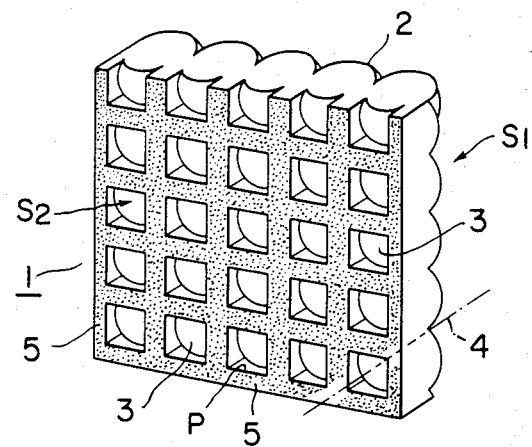
FIG. 1 is a fragmentary perspective view of a preferred embodiment of a rear projection screen in accordance with the present invention.

FIG. 1 is a schematic fragmentary perspective view of a preferred embodiment of a rear projection screen 1 in accordance with the present invention. The rear side of the screen with respect to a viewing field is a first lens surface $S_1$ consisting of an array of a plurality of convex lenses 2 while the front side of the screen is a second lens surface $S_2$ consisting of an array of a plurality of convex lenses 3 whose optic axes 4 are substantially in line with those of respective convex lenses 2 of the first lens surface $S_1$. A checkerboard-like projection P with light masking strips or layers 5 is extended forwardly of the second lens surface $S_2$ and is located at boundaries of the lenses 3. The rays of light projected from a projector are refracted on the first lens surface $S_1$ toward the optic axes 4 of the first lenses 2 and accordingly the rays of light do not pass through the boundaries of the second lenses 3.

Figure 2:
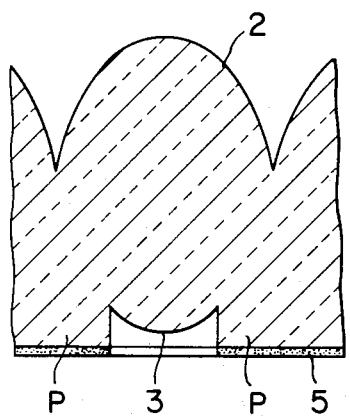
FIG. 2 is a fragmentary cross sectional view of the screen, shown on enlarged scale.

FIG. 2 is a fragmentary cross sectional view, on enlarged scale, taken along a horizontal plane containing the axes of the convex lenses 2 and 3. The convex lenses 2 and 3 are spherical, ellipsoidal or parabolic. It is preferable that the focal point of each convex lens 3 substantially coincides with the surface of the convex lens 2 because of the advantage that when a plurality of rays of light (for instance, red, green and blue light beams emitted from three projection cathode-ray tubes of a color television projection system) are incident on the same spot on the surface of the convex lens 2 at different angles of incidence, they are refracted into parallel rays. Fruthermore it is preferable that the focal point of each convex lens 2 substantially coincides with the surface of each convex lens 3. Alternatively, the focal point of each convex lens 2 is preferably located at the surface of each lens 3 or at a point slightly forwardly of each convex lens 3; that is, at a point on the plane containing the masking strips 5. Thus, the rays of light coming from the convex lens 2 are converged at those positions so that the masking strips 5 can be increased in width. As a consequence, the effects of the masking strips 5 for cutting off stray light and preventing the reflection of external light can be much enhanced.

The divergence in the horizontal direction of light emanating from the rear projection screen (to be referred to as "an angle of view") is dependent upon the configurations, materials or indices of refraction of the convex lenses 2 and 3 and the width and height (from the second lens surface $S_2$) of the masking strips 5.

Same is true for the divergence in the vertical direction. However, in the case of the vertical section (See FIG. 3), the radius of curvature of the convex lens 2 or 3 may be greater than that as shown in FIG. 2. The convex lens 2 or 3 may be spherical, ellipsoidal, parabolic or other suitable surface of revolution. When the radius of curvature is increased as described above, the focal point of each convex lens 3 is located outside of the surface of each convex lens 2 in the vertical section. As a result, the effect of refracting for making the rays of light incident at the same point on the first lens surface $S_1$ at different angles of incidence parallel to one another when the rays of light come out of the screen is degraded, but such degradation (that is, the fact that the rays of light are not parallel to one another in the vertical direction) is almost negligible in practice in the case of a projection color television system in which three projection cathode-ray tubes are disposed in parallel in one line because the color distortions in the vertical direction hardly occur as compared with in the horizontal direction.

The focal point of each convex lens 2 may be located outwardly of the masking strips 5 and the convex lens 3 because the angle of view in the vertical direction may be smaller than that in the horizontal direction. For instance, with respect to the angle of view in the vertical direction, it is enough to consider only two cases where viewers standing and sitting may watch the image displayed on the screen. However, with respect to the angle of view in the horizontal direction it must be considered that viewers may watch the screen even when they are sitting or standing obliquely sideward of the screen in the extreme case. Thus, in practice, the angle of view in the vertical direction may be narrow.

Figure 3:
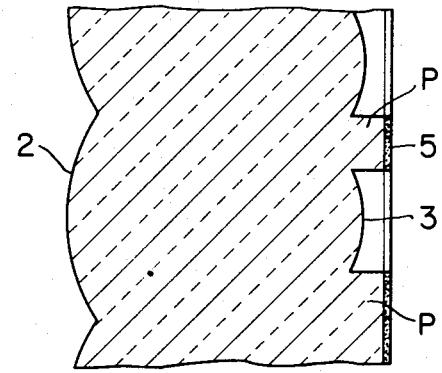
FIG. 3 is a fragmentary longitudinal sectional view of the screen, shown on enlarged scale.

Furthermore, the width of the masking strips may be slightly reduced so that the decrease in luminance can be avoided. The objects of the provision of the masking strips 5 are (a) to cut off stray light resulting from refraction and reflection of light entering the first lens surface $S_1$ (rear convex lenses 2) and (b) to prevent the reflection of external light such as room light incident on the second lens surface $S_2$ (front convex lenses 3). As shown in FIGS. 1, 2 and 3, the masking strips 5 are coated or otherwise formed on the ribs of the checkerboard-like projection P with an array of square apertures or openings which is extended forwardly of the second lens surface $S_2$ (the front convex lenses 3).

As mentioned above, both sides of the rear projection screen have convex lenses so that the center portions of rays of light projected from a projector and entering the convex lenses 2 are emitted from the front convex lenses 3 in the direction parallel to the optic axis of the screen respectively.

Therefore, without the use of a combination of a circular Fresnel lens and another lens, luminance is uniform from the center of the screen to the edges thereof. Since, as described above, the emanated light beams are in parallel with each other, distribution of the emitted rays of light becomes substantially uniform. As a result, uniform color balance can be maintained regardless of a viewing position.

The degree of diffusion in the horizontal direction of the incident light is dependent upon the horizontal cross sectional configuration of the rear convex lenses while the degree of diffusion in the vertical direction is dependent upon the vertical cross sectional configuration of the rear convex lenses. Therefore, when the shapes of individual convex lenses are suitably controlled, a rear projection screen with a predetermined angle of view can be provided.

Moreover, the rear projection screen of the present invention has convex lens at the rear side so that the use of a circular Fresnel lens for the purpose of converging the incident light to a desired region can be eliminated. Therefore, moire-image interference fringes which are produced by the interference between the grooves of a circular Fresnel lens and light masking layers can be almost eliminated so that the projected image can be viewed more vividly and sharply. In the fabrication of circular Fresnel lenses, a large mold is needed so that the fabrication is complicated and difficult. When a Fresnel lens is sectionalized and assembled together, adverse effects resulting from the joints between the segments are enhanced.

Furthermore, the rear projection screen is provided with light masking strips or layers so that stray light may be cut off and the reflection of light can be prevented and consequently a high degree of contrast of image can be ensured.

Figure 12:
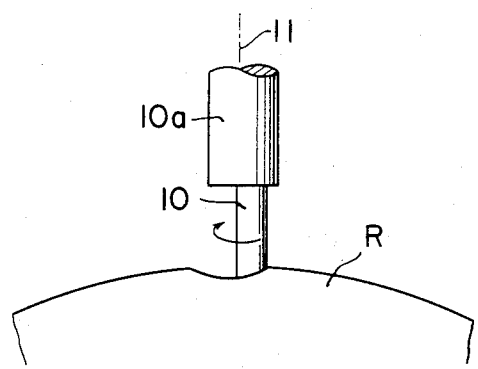
FIG. 12 is a view to explain the state in which a molding roll for the screen is formed by a cutting tool.

Next, the materials and methods for fabricating the rear projection screen of the type described above will be described. Transparent plastics such as acryl, vinyl chloride, polyester, cellulose acetate, polystyrene polycarbonate and the like are adapted for the fabrication of the screen because they are light in weight and can be easily molded or machined. In addition, glass may be also used. The use of such conventional materials can facilitate to manufacture the screens. In the case of the mass production, it is preferable to use molds with cavities complementary to the convex lenses 2 and 3. It is especially preferably that the molds are in the form of a roll R as shown in FIG. 12. A molding roll R can be fabricated by rotating a cutting tool 10 with a predetermined shape so as to cut the cylindrical surface of the roll R. When it is desired that the convex lens 2 or 3 (See FIG. 3) has a surface such as convex ellipsoidal surface or the like except a spherical surface, while the cutting tool 10 is rotated, it is moved in a predetermined direction along the side surfaces of the roll. Alternatively, while the roll is rotated, the cutting tool is advanced and retracted according to a predetermined program, whereby the cross sectional configuration of the convex lens 3 can be controlled. Furthermore, the shape of the convex lens can be varied by changing the angle of the axis of the cutting toll 10 with respect to the roll surface.

Figure 4:
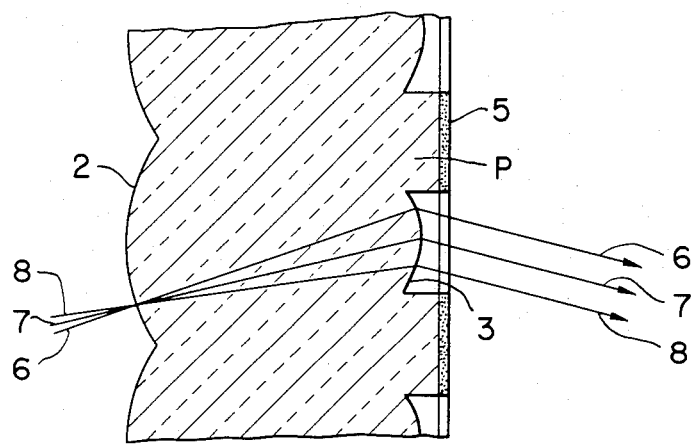
FIG. 4 is the same view as that of FIG. 3 for showing the path of light in the screen.

In FIG. 4 is shown a portion of a screen molded with a mold fabricated by inclining the axes 11 of a rotary shaft 10a carrying a cutting tool at an angle relative to the normal to the cylindrical surface of a mold. The surface of the lens 3 is not in the form of a sphere but in the form of a deformed sphere. When three rays of light 6, 7 and 8 are incident on the same point on the convex lens 2, they are refracted and emanated from the convex lens 3 slightly downwardly. Therefore, the rays of light incident adjacent to the edges of the screen can be converged toward the center of the screen. The horizontal cross section (See FIG. 2) may be also so controlled that the rays of light incident adjacent to the edges of the screen in the horizontal direction may be directed toward the center of the screen. It almost does not need to converge the rays of light toward the center of the screen at and in the vicinity of the center of the screen. The rays of light incident at and in the vicinity of the edges of the screen must be directed toward the center of the screen. The necessity of directing the rays of light toward the center of the screen is gradually increased as the incident position of each ray of light comes close to either edge of the screen. This can be done by controlling the angle of the rotary shaft carrying the cutting tool. In addition, it is also possible to place a screen at a high place so that the rays of light may be directed toward a lower place. Furthermore, a screen may be placed at a lower position so that the rays of light emanating from the screen may be directed toward a desired high place or area.

After the molds are fabricated in the manner described above, molding steps are carried out. Heating molding process or rolling molding process may be employed for fabricating the molds. It is preferable to carry out the molding process immediately after the heating or melting of plastic materials because the process for reheating the plastic materials prior to the molding process can be eliminated. Thus the thermal-energy savings can be attained. In addition, in the case of the mass production, immediately after the extrusion process, a molding process with molding rolls can follow.

Masking strips may be provided by the conventional printing, coating or transfer process. Materials for masking strips may be compounds capable of shielding and absorbing light. For instance, they may conventional paint or ink mixed with black pigments and delustering agents, if required. The checker-board-like projection P may be so molded as to have flat surfaces, whereby the formation of masking strips may be facilitated. To this end, a mold may be fabricated in the following manner. First, a mold blank is provided with a plurality of cavities for molding convex lenses 3 and grooves with a flat bottom are cut around individual cavities, the depth of the grooves being greater than that of the lens-forming cavities.

Figure 6A:
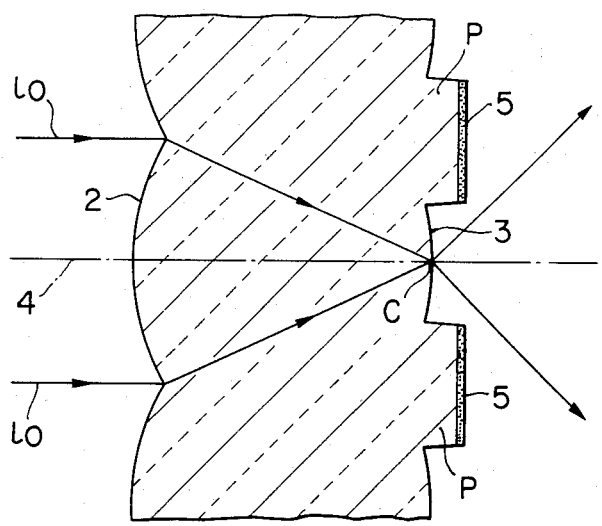
FIG. 6(A) and FIG. 6(B) are views to explain the transmission of light at an edge of the screen.

The rear projection screen in accordance with the present invention has the capability of converging rays of light. Therefore, the use of a circular Fresnel lens in combination with the screen can be eliminated. Incident rays $l_0, l_0$ of light enter the screen parallel to the optic axis of a lens 3 in the vicinity of the central portion of the screen and is concentrated at the center point C of the second lens 3 as shown in FIG. 6(A). Accordingly, no problems will occur. However, the closer to the edges of the screen the point at which a ray of incoming light is incident is, the greater the angle of incidence becomes. (The angle of incidence is defined as an angle between the incident ray and the normal line or line perpendicular to the lens surface at the point of incidence.)

Figure 6B:
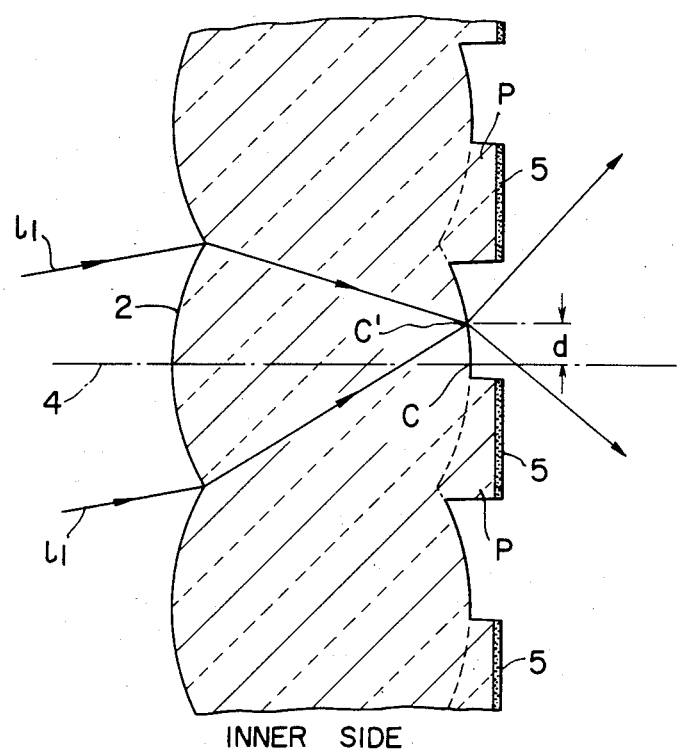

For example, adjacent to the edges of the screen 1, the rays $l_1, l_1$ are incident on a lens 2 at greater angles of incidence as shown in FIG. 6(B). Thus, in that case, the rays $l_1, l_1$ of light entering the first lens 2 are concentrated at a point C' deviated outward from the center point C of the lens 3. Therefore, if the masking strip 5 is respectively located in exactly opposed relationship with the boundaries between the adjacent convex lenses 2, the strip 5 may shield the rays $l_1, l_1$. As a result, luminance or brightness of the image projected is degraded. In the case of a projection color television, normal color balance, combination or a large angle of view cannot be obtained.

Therefore, the masking strip 5 is displaced outward of the screen 1 by a distance d so that the rays $l_1, l_1$ can pass the convex lens 2. Thus all the rays incident on the convex lens 2 can pass the convex lens 3. In general, the farther the masking strips 5 are spaced apart from the center of the screen, the greater the distance d becomes. This is because the farther the rays are spaced apart from the center of the screen 1, the greater the angle of incidence of the ray becomes and the more the rays are respectively concentrated at points deviated outward from the center points of the lenses 3.

When the pattern of the masking strips 5 is like a checker-board, masking strips 5 must be displaced both in the horizontal and vertical directions. That is, the masking strips 5 must be so positioned that all the rays incident on each convex lens 2 pass through the opposing convex lens 3. Therefore, the preferable positions of the masking strips are calculated beforehand based on the maximum angle of incidence and indices of refraction of the convex lenses and the masking strips are located at the thus calculated positions. For instance, assume that the masking strips are formed over the outer surfaces of a grid-like projection with square or rectangular apertures or openings. Then the feed of a mold blank or a cutting tool for cutting cavities for the lenses and grooves for the projection is varied relative to each other when the cavities and the grooves are formed. However, at the center of the screen, the masking strips 5 are disposed in immediately opposed relationship with the valleys or boundaries between the adjacent convex lenses 2.

Figure 5A:
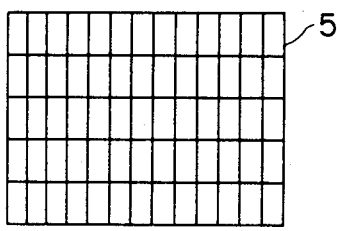
FIG. 5(A) and FIG. 5(B) show patterns, respectively, of light masking strips or layers.
Figure 5B:
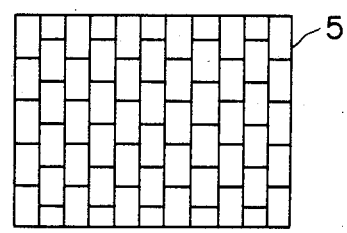

In FIG. 5(A) is shown the most simple pattern of convex lenses and masking strips of the rear projection screen in accordance with the present invention. As shown in FIG. 5(B), the rectangular apertures or openings may be staggered vertically. Alternatively, the pattern as shown in FIG. 5(B) may be rotated through 90° for another screen. Furthermore, a tortoise shell pattern may be used.

Figure 7:
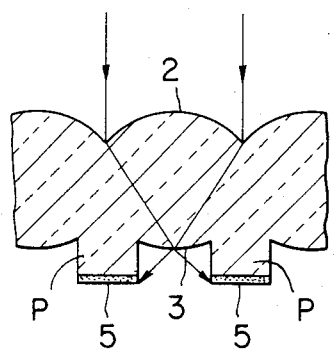
FIG. 7 is a view to explain the refraction of light rays incident at the endges of a lens of the first lens surface.

If the raised portions or projections P are too high (measured from the surface of the convex lens 3), some of the rays emanating from the convex lens 3 strike against the side surfaces of the raised portions or projections P to cause interception of the rays as shown in FIG. 7.

Figure 8:
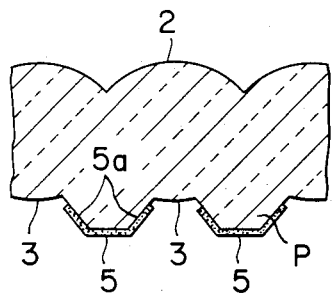

Therefore, as shown in FIG. 8, the side edges or shoulders of the raised portions or projections P are beveled so that the raised portions or projections have a trapezoidal cross sectional configuration. Thus, all the rays incident on the convex lens 2 can pass the opposed convex lens 3. In addition, the area of the masking strip 5 can be increased as the masking material can be applied to the beveled portions 5a, whereby the reflection of ambient light can be avoided more effectively. Especially, this is useful to improve contrast on the screen when the viewers watch it from the lateral direction of the screen.

Figure 9:
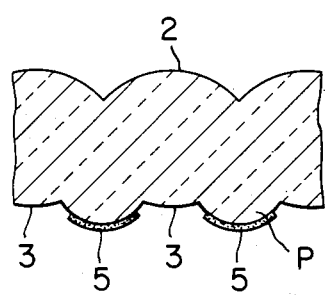

The similar effects can be attained by forming the tops of the raised portions or projections P in the shape of arc in cross section as shown in FIG. 9.

Figure 10:
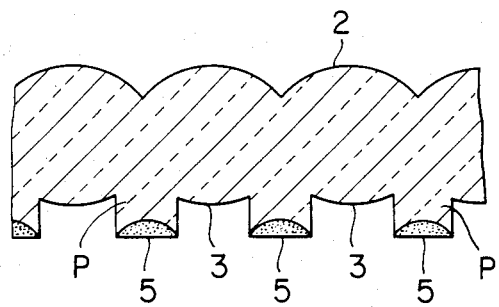
FIG. 8 through FIG. 11 are views to explain modifications of the raised portions or projections upon which are formed light masking strips, FIG. 8 showing that raised portions or projections are beveled, FIG. 9 showing that raised portions or projections are arcuately shaped in cross section, FIG. 10 showing that the tops of raised portions or projections have grooves in the shape of an arc in cross section, FIG. 11 being a view similar to FIG. 8 showing that the tops of the raised portions or projections have grooves in the shape of an arc.
Figure 11:
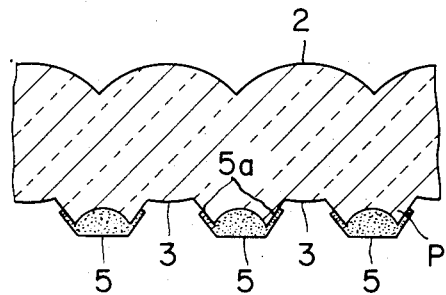

As described before, the masking strips 5 can be formed by the printing, transfer or coating process. However, when the raised portions or projections P as shown in FIGS. 1 through 7 are covered with a light-masking or light-shielding material, the material spreads not only over the top side edges but also on the side walls of the raised portions or projections P, and density of ink is apt to become low at the center portions of the projections. Therefore, as shown in FIG. 10, the top of the raised portion or projection P may be grooved in the shape of an arc in cross section so that the light-masking ink or the like can be stably received not only at the center portion of a groove but also at the side edge portion thereof. Furthermore, the top of the raised portion or projection as shown in FIG. 8 may be formed with an arcuate groove in cross section as shown in FIG. 11. Then the light-masking material can be applied not only over the beveled portions 5a but also into the arcuate groove, including the side edge of the groove.

If the ability of diffusing light is imparted to the surfaces of the convex lenses 3, glittering of the screen and the reflection of ambient light can be avoided. To this end, a light diffusion agent containing light diffusion particles may be coated over the surfaces of the convex lenses 3. Another method is to thermally bond to a screen blank a plastic film containing light diffusion particles and to polish the surfaces of the convex lenses 3 through the sand blasting process. In order to prevent glittering, the rear side of the screen may be imparted with the capability of diffusing light, but as compared with the case where only the front side of the screen has the light diffusion capability, the image is slightly degraded in sharpness. Furthermore, a screen blank itself may contain a light diffusion agent, but this is not preferable because the sharpness of the image projected on the screen is degraded and luminance is decreased. However, for the purpose of avoiding glittering and reflection, it is preferable that the screen blanks themselves contain a light-diffusion agent.

What is claimed is:

1. A rear projection screen used as a screen of television systems or the like to form images thereon by rays of light projected from at least one projector located in a rear position of the screen, which comprises:
    a first lens surface formed on one side and having an array of a plurality of convex lenses;
    a second lens surface formed on the other side and having an array of a plurality of convex lenses whose axes are substantially in line with those of the convex lenses of said first lens surface; and
    light masking layers formed on projections or raised portions which are projected so as to surround each of convex lenses of the second lens surface and which are extended forwardly of said second lens surface.

2. A rear projection screen as set forth in claim 1, wherein each of the convex lenses of said second lens surface has its focal point located substantially on the surface of the corresponding convex lens of said first lens surface.

3. A rear projection screen as set forth in claim 2, wherein each of the convex lenses of said first lens surface has its focal point located substantially on the surface of the corresponding convex lens of said second lens surface.

4. A rear projection screen as set forth in claim 1, wherein the positions of said masking layers which are formed on said raised portions or projections are so displaced toward the edges of said screen that all the incident rays incident on the convex lenses of said first lens surface can pass the corresponding convex lenses of said second lens surface.

5. A rear projection screen as set forth in claim 1, wherein the top side edges of each of said raised portions or projections are beveled, and a light-masking or light-shielding material or ink is applied not only to the top of each raised portion or projection but also to the beveled portions.

6. A rear projection screen as set forth in claim 1, wherein the top of each of said raised portions or projections is projected in the shape of an arc in cross section.

* * * * *